Jan. 29, 1935. E. F. DICKIESON, JR 1,989,404
CLUTCH
Filed Oct. 20, 1931 2 Sheets-Sheet 1
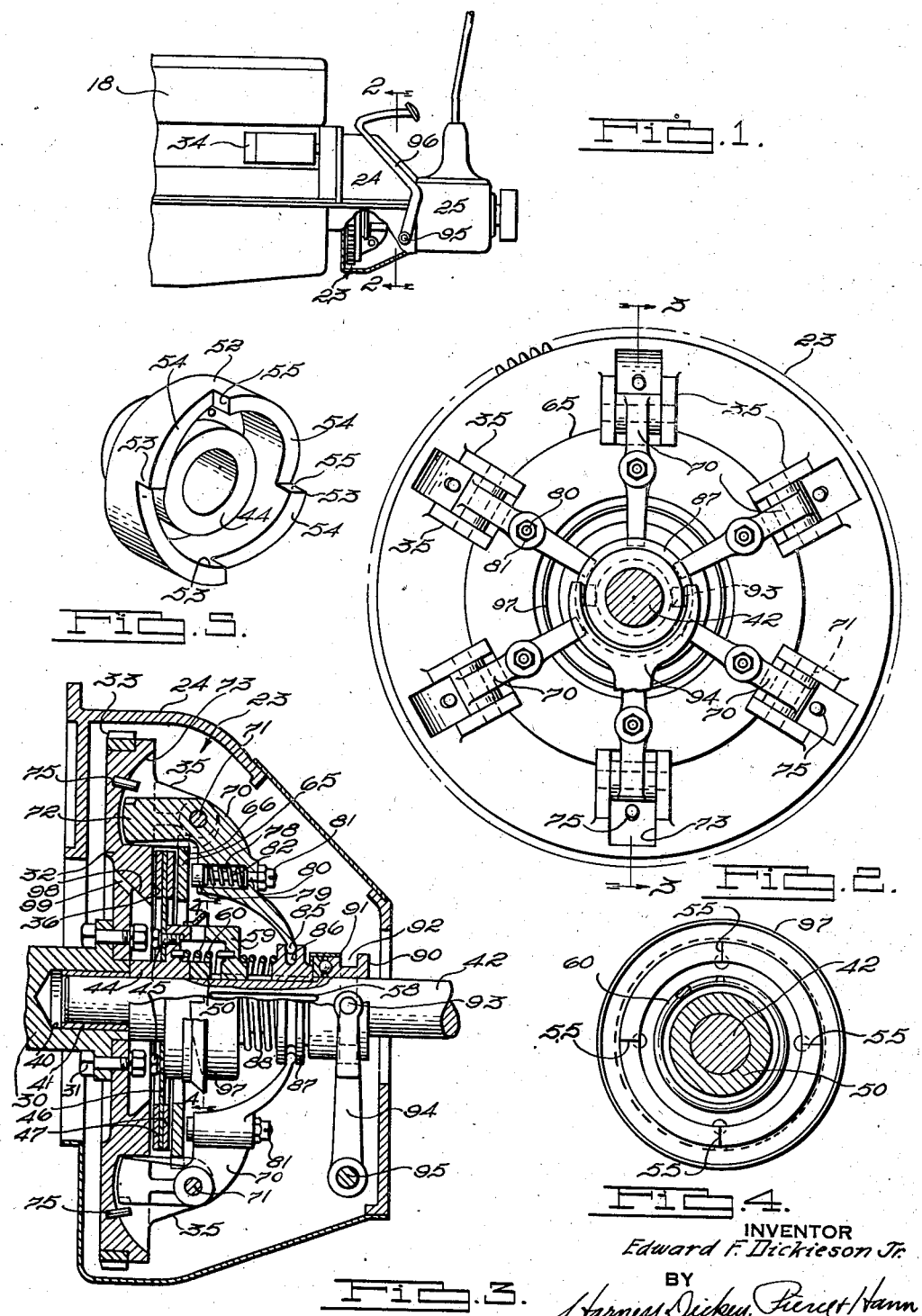
INVENTOR
Edward F. Dickieson Jr.
BY
ATTORNEYS Jan. 29, 1935. E. F. DICKIESON, JR 1,989,404
CLUTCH
Filed Oct. 20, 1931 2 Sheets-Sheet 2
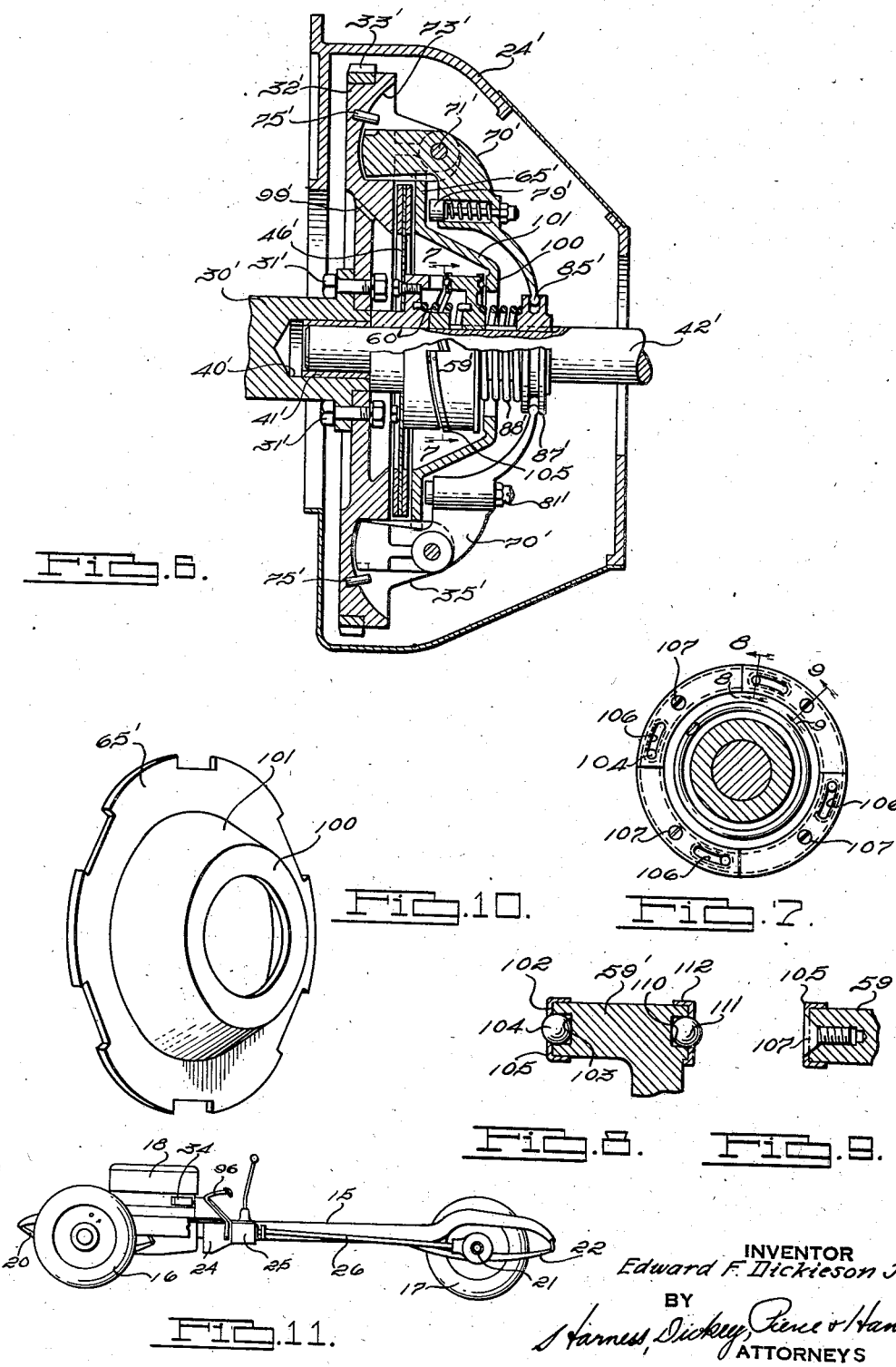
INVENTOR
Edward F. Dickieson Jr.
BY
ATTORNEYS Patented Jan. 29, 1935

1,989,404

UNITED STATES PATENT OFFICE 1,989,404

CLUTCH

Edward F. Dickieson, Jr., Detroit, Mich., assignor to Eaton Manufacturing Company, a corporation of Ohio Application October 20, 1931, Serial No. 569,972

3 Claims. (Cl. 192—103)

This invention relates to power transmitting mechanisms and particularly to that type thereof commonly known as clutches and which are employed for the purpose of releasably connecting a driving and a driven member. Although applicable for use in connection with a variety of different types of mechanisms the invention is particularly applicable for use in connection with motor vehicles for the purpose of releasably connecting the engine thereof with the road wheels of the vehicle.

Objects of the invention are to provide a clutch of novel construction; to provide a clutch which will disconnect the driving and driven elements thereof under certain conditions of operation; to provide a clutch embodying means for automatically disconnecting the driving and driven elements thereof when the speed of the driving element falls below a predetermined value; to provide a clutch in which provisions are incorporated for automatically disconnecting the driving and driven elements thereof under conditions where the driven element tends to drive the driving element; and to provide a clutch embodying both automatic and manual control means therefor.

Another object is to provide a clutch embodying driving and driven elements together with centrifugally actuated means for controlling the engagement thereof; to provide a clutch of the type described in which the force of the centrifugally actuated means is resiliently impressed upon the clutch element; to provide a clutch of the type described in which the force of centrifugally actuated members acting to maintain the clutch in engaged position is transmitted to the movable clutch element through resiliently mounted members; to provide a clutch of the type described in which such resilient members are subject to adjustment; to provide a centrifugal type of clutch in which means are provided for automatically synchronizing the action of the various centrifugally actuated members; and to provide a clutch including a plurality of masses adapted to be acted upon by centrifugal force tending to maintain the clutch in engaged position, and in which means are provided for synchronizing the movements of such weights whereby to maintain a condition of balance in the clutch as a whole.

Other objects of the invention are to provide a clutch for connecting the engine and road wheels of a motor vehicle and so constructed that upon certain conditions of operation when the road wheels tend to drive the engine, the engine will automatically be disconnected from the road wheels; to provide a clutch responsive to certain conditions of torque reaction existing between the engine and the road wheels to automatically disconnected the same; to provide a motor vehicle driving mechanism in which reversal of the torque reactions in the connections between the road wheels and the engine, in one direction, will automatically release the clutch; to provide a driving mechanism for motor vehicles by the use of which the transmission may be more easily shifted; and to provide a clutch for an automotive vehicle automatically releasable under certain operating conditions, together with manually operable means effective to prevent such automatic operation.

The above being among the objects of the present invention the same consists in certain features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views,—

Figure 1 is a fragmentary partially broken side elevational view of a unitary power plant for a motor vehicle, and in which a suitable embodiment of the present invention is shown incorporated.

Fig. 2 is an enlarged view taken on the line 2—2 of Fig. 1, constituting a rear elevational view of the clutch embodied in the construction illustrated in Fig. 1.

Fig. 3 is a partially broken vertical sectional view taken on the line 3—3 of Fig. 2.

Fig. 4 is a vertical sectional view taken perpendicular to the axis of the clutch as on the line 4—4 of Fig. 3;

Fig. 5 is a perspective view of one of the cam members cooperating with the driven member of the clutch shown in the preceding view.

Fig. 6 is a view similar to Fig. 3 but showing a modified form of my invention.

Fig. 7 is a view taken substantially on the line 7—7 of Fig. 6 and showing one of the clutch cam elements in end elevation.

Fig. 8 is an enlarged fragmentary sectional view taken on the line 8—8 of Fig. 7.

Fig. 9 is a fragmentary enlarged sectional view taken on the line 9—9 of Fig. 7;

Fig. 10 is a perspective view of the clutch pressure ring element of the construction shown in Fig. 6.

Fig. 11 is a more-or-less diagrammatic, partially broken side elevational view of a motor vehicle embodying the present invention.

The use of centrifugally controlled clutches in automotive and other fields is well known. Likewise the use of an overrunning clutch in the driving connection between the engine and the road wheels of a motor vehicle is well known. However, in the forms of such clutch as have heretofore been proposed, in order to obtain the benefit of the combined action of both of such clutches it has been necessary to provide two distinct and substantially independent clutch units, necessarily embodying considerable expense and, as far as I am aware, necessitating the employment of a structure of substantial bulk in comparison with clutch structures as employed in present day motor vehicles. One of the main purposes of the present invention is to provide a single clutch structure embodying advances of both a centrifugally actuated clutch and an overrunning clutch, and while such clutch mechanism is obviously adaptable for use in connection with a great variety of mechanisms, it is particularly adaptable for use in connection with motor vehicles, and consequently, as a matter of illustration principally its description and explanation will be confined to its adaptations of motor vehicle uses only, it being understood that its adaptation to other uses will be obvious from the description thereof.

Referring to the drawings it may be well to first refer to Fig. 11 in which a motor vehicle is more-or-less diagrammatically indicated as having a chassis frame 15, front wheels 16, rear wheels 17 and an engine 18. The front wheels 16 are connected to the chassis 15 by means of an axle (not shown) and spring 20 in a conventional manner. The rear wheels 17 are mounted upon a suitable driving axle 21 which may be of conventional construction and which in turn is connected by springs such as 22 to the chassis frame 15 in a conventional manner. As also indicated in Fig. 1, a clutch 23 is enclosed in a housing 24 secured to the rear end of the engine 18, and mounted upon the rear end of the housing 24 is a transmission mechanism indicated generally at 25 and which may be of any conventional construction. A propeller shaft 26 operatively connects the transmission 25 with the rear axle 21.

Referring now to Figs. 2 to 5 inclusive, and particularly to Fig. 3 it will be noted that the rear end of the engine crank shaft 30 has secured thereto by bolts such as 31 in a conventional manner a flywheel 32 which, in accordance with conventional practice, forms a part of a clutch mechanism. In accordance with conventional practice the flywheel 32 may be peripherally provided with a ring gear 33 for cooperation with an electric starter 34 in accordance with conventional practice. In accordance with the present invention the rear face of the flywheel 32 is provided with a plurality of pairs of rearwardly projecting spaced ears or lugs 35 arranged thereon in a circle concentric with the axis of the crank shaft 30. Radially inwardly of the lugs 35 the flywheel 32 is provided with a flat rear face 36 disposed in a plane perpendicular to the axis of the crank shaft 30. The rear end of the crank shaft 30 is centrally recessed as at 40 and receives therein a bearing bushing 41 which rotatably supports the forward end of the clutch driven shaft 42.

A radially flanged sleeve 44 is rotatably mounted upon the shaft 42 immediately rearwardly of the flywheel 32 and has secured thereto by bolts such as 45 a clutch driven plate 46 which may be provided with the usual annular friction facings 47 on opposite sides thereof. The facing 47 on the forward side of the disc 46 normally lies in substantially contacting relationship with respect to the rear face 36 of the flywheel 32 in accordance with usual practice. Axial movement of the sleeve 44 on the shaft 42 is limited by reason of its being confined between the rear end of the crankshaft 30 and a thrust member 50 secured against movement to the shaft 42.

As best illustrated in Fig. 5, the sleeve member 44 is provided with a tubular peripheral flange portion 52 the rear edge of which is machined to provide a plurality of ratchet-like teeth 53 presenting helical cam surfaces 54. The surfaces 54 are inclined axially rearwardly in the direction of rotation of the crankshaft 30 for a purpose that will hereinafter be explained. A flat surface 55, lying in a plane radial to the sleeve 44, is provided between each adjacent part of teeth 53.

The shaft 42 rearwardly of the sleeve 44 is splined as at 58 (see Fig. 3) and slidably received on and maintained against relative rotation on the shaft 42 by the splines 58 in a forwardly opening cup shaped member 59 of a diameter corresponding with the peripheral flange 52 on the sleeve 44. The forward edge of the member 59 is machined to a shape complementary to the shape of the teeth 53 on the member 54 so that the teeth thereof may inter-engage with the teeth 53. A torsion spring 60 surrounding the shaft 42 between the sleeves 44 and the cup member 59 has opposite ends thereof anchored in the sleeve 44 and cup 59 respectively and is normally maintained under torsion tending to rotate the cup 59 in a right hand direction as viewed from the right of Fig. 3, and which direction of rotation tends to bring the faces 55 of the teeth on the member 44 and the corresponding faces of the teeth on the member 59 into contact with each other.

A pressure plate 65 having a notched out periphery adapted to interfit the lugs 35 on the flywheel 32 in order to maintain it against relative rotation with respect to and centrally of the flywheel 32 without restricting axial movement thereof, is positioned immediately rearwardly of the clutch disc 46 and, as in usual constructions, is adapted when properly actuated to clamp the clutch disc 46 against rotation to the rear face 36 of the flywheel 32.

Arms 70 disposed in a generally radial plane with respect to the clutch are pivotally secured by means of pins such as 71 between each pair of ears 35 on the flywheel 32. Each of the arms 70 has rigidly associated therewith a forwardly extending weight portion 72, the rear face of the flywheel 32 being recessed as at 73 for the free reception of the forward end of the weight 72 therein. Stop pins 75 secured in the flywheel 32 at the bottom of each of the recesses 73 projects into the path of movement of the respective weights 72 in order to limit their outward movement therein.

Each of the arms 70 between its pivot pin 71 and the shaft 42 is provided with a forwardly opening bore 78 whose axis is approximately parallel to the axis of the shaft 42, and within each of the bores 78 is received a plunger 79 having a stem 80 which slidably projects through the arm 70 at the rear end of the bore 78 and on such projecting end threadably receives a nut 81. A coil spring 82 encircles each of the stems 80 within the bore 78 and is maintained under constant compression between the ends of the bore 78 and the plunger 79, and consequently constantly urges the plunger 79 forwardly out of the bore 78. The nut 81 is preferably so adjusted on the stem 80 as to allow the plunger 79 to project a desired amount beyond the corresponding face of the arm 70 and into a position which, under normal conditions when the clutch is not rotating, is slightly spaced from the pressure plate 65.

The radially inner ends of the arms 70 extend inwardly and rearwardly into spaced relation with respect to the surface of the shaft 42 where they are reduced in size to form fingers 85 and all these fingers 85 are slidably received within the annular groove 86 of the axially slidable collar 87 relatively non-rotatably mounted on the shaft 42. The collar 87 thus ties all of the arms 70 together for equal movement about their respective pivot pins 71. A coil spring 88 encircling the shaft 42 between the cup 59 and the collar 87 is maintained under constant compression between the parts and not only constantly urges the collar 87 rearwardly, and thus the inner ends of the arm 70 rearwardly, but also constantly urges the cup 59 forwardly. The force of the spring 88 is superior to any axial force that may be exerted by the spring 60 and consequently urges the complementary teeth of the sleeve 44 and cup 59 into complete engagement.

An additional feature of the construction which is desirable in connection with the present invention, but which is to be understood as not being essential in all cases, is a sleeve 90 rotatably and slidably mounted upon the shaft 42 rearwardly of the collar 87. The collar 90 carries at its forward end a thrust bearing indicated generally as at 91 and is peripherally grooved as at 92 to receive diametrically opposite pins 93 carried by the upper yoked end of a lever 94 fixed to a shaft 95 rotatably supported in the casing 24. Exteriorly of the casing 24 the shaft 95 is provided with a foot pedal 96 of conventional construction, as best illustrated in Fig. 1. It might also be noted before passing on to the explanation of the operation of the above described mechanism that it may be preferable to provide an oil throw ring such as 97, as illustrated in Fig. 3, on the tubular periphery of the sleeve 44 so as to direct lubricant away from the friction surfaces of the clutch, and also to provide the recessed rear face of the flywheel 32 with an inclined wall such as 98 and cooperating drain openings 99 for the same purpose.

Considering now that the above described clutch mechanism is incorporated in a motor vehicle in the manner illustrated in Figs. 1 and 11 for the purpose of illustration, it will first be supposed that the vehicle is at rest and the engine 18 is not operating. In such a case it will be obvious that the weights 72 will not be subjected to centrifugal force and consequently the force of the spring 88 will be sufficient to force the collar 87 rearwardly, carrying with it the inner ends of the arms 70 and consequently releasing the clutch driven plate 46 from clamped relation between the pressure ring 65 and the rear face 36 of the fly wheel 32. In such a case, regardless of the shiftable position of the transmission mechanism 25, the engine 18 is totally disconnected from the rear wheel 17 of the motor vehicle.

In case it is desired to drive the motor vehicle, the first operation will be to start the engine 18 in operation, and when this occurs the fly wheel 32 in rotating will, of course, subject the weights 72 on the ends of the arms 70 to a centrifugal action tending to throw the weights radially outwardly. The force of the spring 88 is so proportioned relative to the mass and position of the weights 72 with respect to their pivotal points 71 that the engine may rotate at idling speed, normally in the neighborhood of 350 revolutions per minute, without the combined force of the centrifugal action of the various weights 72 overcoming the force of the spring 88 sufficiently to cause an engagement of the clutch. It will thus be apparent that under any circumstance when the engine is rotating at or in the neighborhood of idling speed the clutch will be disconnected without any effort on the part of the driver of the vehicle.

The next operation on the part of the driver of the motor vehicle, it being understood that the clutch is now considered to be disengaged, is to shift the transmission 25, for instance, into low gear. This act accomplished the driver then increases the speed of the engine, preferably gradually, as by stepping on the accelerator (not shown) in accordance with conventional practice. As the speed of the engine is gradually increased above idling speed the centrifugal force acting on the various weights 72 increases, gradually overcoming the force of the spring 88 with gradual increase of engine speed, and the arms 70 begin to swing around their pivot pins 71. This continues until the plungers 79 engage the pressure ring 67 and resiliently urge it forwardly for clamping relation with respect to the clutch driven plate 46. Due to the plungers 79 being resiliently pressed outwardly by the springs 82, and particularly if the speed of the engine is increased gradually, the clamping effect on the clutch driven plate 46 will be gradually increased allowing a gradually decreasing amount of slippage between the disc 46 and the fly wheel until the disc 46 is eventually clamped against rotation relative to the fly wheel. The exact point at which this will occur will depend to some extent upon the rate at which the engine speed is increased and upon the force exerted by the various springs 82. In either case, however, the force of the springs 82 may eventually be overcome to such an extent that the plungers 79 may recede completely into the arms 70 and the adjacent surfaces of the arms 70 abut directly against the pressure plate 65. However, it is preferred that the arms 70 be stopped from further pivotal movement by engagement of the weights 72 by the stop pins 75 before solid contact occurs between the arms 70 and the pressure plate 65, the springs 82, in such case, being designed to exert sufficient pressure to insure the clutch transmitting the full torque without slippage. It may also be pointed out that in such a design the pins 75 maintain the weights 72 in a fixed position relative to the axis of the clutch over the greater speed range of the engine and thus maintain the balance of the clutch over the higher speed ranges of the engine.

With the clutch thus completely engaged the engine is speeded up to the desired point and the driver then removes his foot from the accelerator. In such case the direction of the torque being transmitted through the propeller shaft 26 between the rear wheels and the engine will be reversed, it being understood that the clutch is still engaged, with the result that the tendency will be for the vehicle to drive the engine and to turn the clutch shaft 42 at a rate of speed greater than that of the crank shaft 30. When this occurs the torque, in being transmitted from the shaft 42 to the clutch driven plate 46 through the cup member 59 and sleeve member 44, will necessarily have to be transmitted through the inter-engaging cam surfaces on these latter members and, as a consequence thereof, the cup member 59 will attempt to turn faster than the sleeve member 44. The lead of the cam surfaces 54 on the sleeve member 44 and the corresponding surfaces of the member 59 are such that when a material torque is exerted on the shaft 42 tending to drive the engine from the wheels, the member 59 will rotate relative to the member 44 and in rotating, because of the cam surfaces, will be forced rearwardly against the force of the spring 88 which, because of the movement of the arms 70 in moving the clutch to fully engaged position, has been placed under an increased compression force.

Considering the force of reaction between the cam surfaces on the members 44 and 59 to be sufficient in the case under consideration, the member 59 in moving rearwardly will force the collar 87 rearwardly, moving the inner ends of the arms 70 rearwardly and consequently moving the weights 72 inwardly against the centrifugal force to which they are subjected. Obviously, when this occurs the driven disc 46 will be released from the fly wheel and the clutch will have been moved to disengaged position, permitting the transmission 25 to be shifted into the next gear and the operation repeated until the transmission is placed in direct or high speed position, after which the motor vehicle may be driven in the usual manner.

If, while the motor vehicle is being driven in direct or high gear, the operator releases his pressure on the accelerator, under which circumstances the vehicle will immediately attempt to drive the engine, the reaction between the cam surfaces on the members 44 and 59 will tend to move the clutch to disengaged position and, if the operator has removed his foot entirely from the accelerator, as soon as the clutch is disengaged in this manner the engine speed will immediately be reduced to its idling speed, allowing the spring 88 to move the weights 72 to their innermost positions in which case the clutch will automatically be disconnected without reference to the torque being transmitted to the clutch from the drive wheel of the vehicle. When this happens the torque being transmitted between the members 44 and 59 will immediately drop to a substantially negligible amount, permitting the torsion spring 60 to return the members 44 and 59 to their normal positions, and the motor vehicle will then continue to coast with the engine completely disengaged from the driving wheels. While the vehicle is thus coasting, should it be desired to again connect the engine to the driving wheels for any reason, all that is necessary is for the operator to momentarily step on the accelerator so as to increase the engine speed sufficiently to again cause the weights 72 to move outwardly against the force of the spring 88 and cause engagement of the clutch, and as long as the engine is driving the rear wheels, or as long as the torque exerted through the propeller shaft by the rear wheels tending to drive the engine is kept at a relatively low figure by, for instance, a partial movement of the accelerator pedal, the engine will be operatively connected to the driving wheel of the vehicle.

The amount of torque which must be transmitted through the propeller shaft when the rear wheels are tending to drive the engine, in order that the member 59 will rotate relative to the member 44 sufficiently to cause a disengagement of the clutch, may, of course, be varied in the construction indicated in a number of different ways. For instance, the lead of the cam surfaces of the members 44 and 59 may be varied to effect this feature, the center of mass of the weights 72 with respect to the axes of the pins 71 and the amount of such masses may be varied to accomplish the same result, and, likewise, the force of the spring 88 and also the spring 60 may be varied with the same end in view.

It also may be noted that the force which must thus be exerted to cause disengagement of the clutch when the vehicle wheels are driving the engine varies throughout the range of speed of the engine due to the variation in the centrifugal force acting on the weights 72 over the range of speed. However, this last feature does not effect the desirable results obtainable with the construction described for the reason that the amount of torque which may be caused to be exerted through the propeller shaft in driving the engine from the rear wheels will also vary with the speed of the vehicle and, consequently, these two factors offset each other.

Consequently, with the construction above described the operation of the clutch is entirely automatic and may be controlled solely by the operator of the vehicle through proper use of the engine speed governing means. Furthermore, the construction is such that, when desired, by proper manipulation of the engine governing means which, of course, is normally the accelerator pedal, the engine may be disconnected from the driving wheels at most periods of operation where the driving wheels tend to drive the engine although, as previously explained, by proper manipulation of the accelerator disengagement of the clutch may be prevented even when the engine is being driven by the driving wheels.

It will, however, be obvious that in certain cases it may be desirable to use the engine to its fullest extent as a brake, such conditions arising, for instance, when a motor vehicle is traveling down a mountain side, and in order to insure the use of an engine to its fullest extent as a brake under such conditions, additional means including the collar 90, lever 94, shaft 95 and pedal 96 may be provided.

When the pedal 96 is depressed it acts with the shaft 95 and arm 94 to move the collar 90 forwardly, and the collar 90 in moving forwardly abuts against the collar 87 and tends to move it forwardly against the action of the spring 88. Obviously, if the clutch is in its disengaged position, as illustrated in Fig. 3, and the upper end of the pedal 96 is moved forwardly causing the collar 87 to move forwardly, the arms 70 will be swung around their respective pivot pins 71 toward clutch engaged position and the clutch may, accordingly, be forced into engagement regardless of the speed of the engine 18 or the amount of torque being transmitted between the road wheels and the engine tending to separate the members 44 and 59. Consequently, in any case where it is desired to temporarily overcome the automatic disengaging features of the clutch, a suitable amount of pressure applied to the pedal 96 will effectively provide the desired result.

Although previously mentioned, it is desired to call attention to the fact that the fingers 85 on the inner ends of the arms 70 in being engaged in the groove 86 of the collar 87 insures equal and uniform movement of all of the arms 70 and, consequently, an even engagement and disengagement of the clutch. Moreover, it insures the center of mass of all of the weights 72 being maintained in a uniform position relative to the axis of the clutch and, consequently, prevents any condition of clutch unbalance which would tend to set up undesirable vibration due to any non-uniformity that might otherwise occur in the movement of the masses 72.

The modified form of the invention shown in Figs. 6 to 10 inclusive is, in general, substantially identical to that described in the previous views and, consequently, equivalent parts are indicated by the same numerals as in the first described construction except that such members bear a prime mark. The main difference is that in the modified construction the cup member 59' in moving rearwardly under a reversal of the usual direction of torque reactions in the propeller shaft to effect a disengagement of the clutch as previously explained, does not act through the fingers 85' of the arms 70' to release the clutch, but instead contacts directly with an annular flange 100 rigidly carried by a web 101 secured to the pressure plate 65'. The cup member 59' in moving rearwardly as described and in contacting directly with the flange 100 consequently urges the pressure plate 65' rearwardly and the pressure plate 65' in reacting against the arms 70', causes the arms 70' to be rotated towards their inoperative positions.

In this construction, in order to eliminate as completely as possible any friction between the member 59' and the flange 100 which might otherwise interfere with the free functioning of the member 59, and in order to eliminate as completely as possible any friction that might be apparent between the cam teeth of the members 44 and 59, anti-friction balls are provided at these surfaces. As indicated best in Figs. 7, 8 and 9, the cam surfaces 102 of the member 59' are grooved as 103 on their forward face, and received in these grooves are hardened balls 104 which project beyond the corresponding faces 102. Preferably some means such as a retaining strip 105 overlying the cam faces and provided with slots such as 106 through which the balls 104 may project, are secured to such faces by screws such as 107 or other suitable means. Likewise, the rear face of the member 59' which would normally directly contact with the forward face of the annular flange 100 carried by the pressure plate 65' is grooved as at 110, and balls 111 are received in such grooves and are retained therein by a suitable retainer member 112 of a type generally similar to the members 105 previously described except that in this case the retainer members 112 allow continuous rotation of the balls 111.

From the foregoing description it will be apparent that by the use of the present invention an automatically actuated clutch of the centrifugally controlled type is provided which, in addition to the usual features found in this type of clutch, embodies in addition and as a unit therewith means for automatically disengaging the clutch at times which would be impossible with centrifugally controlled clutches as heretofore constructed.

It is also desired to repeat that although in the description of the operation of the present clutch such description has been limited entirely to its application to a motor vehicle, its construction and operation when once appreciated will suggest itself to a variety of widely different applications and accordingly, I do not limit myself solely to its application in a motor vehicle.

Furthermore, it will be apparent that, although I have illustrated but two embodiments of the present invention, various other modifications may be readily effected by those skilled in the art when once my teachings are made known to them and, consequently, formal changes may be made in the specific embodiment of the invention described without departing from the spirit or substance of the broad invention, the scope of which is commensurate with the appended claims.

I claim:

1. In a centrifugal clutch, in combination, a pair of rotatable elements, a pressure plate disposed on that side of one of said elements opposite to the other of said elements, a plurality of weighted arms pivotally secured to one of said elements, and a resilient plunger carried by each of said arms and positioned to engage said pressure plate when said arms are moved under the influence of centrifugal force.

2. In a centrifugal clutch, in combination, a pair of rotatable elements, a pressure plate disposed on that side of one of said elements opposite to the other of said elements, a plurality of weighted arms pivotally secured to one of said elements, a resilient plunger carried by each of said arms for movement in a plane approximately parallel to the axis of rotation of said clutch, and projecting outwardly beyond the surface of said arms towards said pressure plate whereby to engage said pressure plate when said arms are moved under the influence of centrifugal force, and means for adjusting the position of said plungers with respect to their corresponding arms.

3. In a centrifugal clutch, in combination, a pair of rotatable elements, a pressure plate disposed on that side of one of said elements opposite to the other of said elements, a plurality of weighted arms pivotally secured to one of said elements, resilient means carried by each of said arms and positioned to engage said pressure plate when said arms are moved under the influence of centrifugal force, and relatively rotatable cam members one of which is constantly rotatable with one of said rotatable elements, said cam members being cooperable with each other to cause axial displacement of one relative to the other upon relative rotational movement between them in one direction and one of said cam members cooperating with said pressure plate to cause simultaneous axial displacement against the urge of said resilient means.

EDWARD F. DICKIESON, Jr.